(12) United States Patent
Kollman et al.

(10) Patent No.: US 8,505,425 B2
(45) Date of Patent: Aug. 13, 2013

(54) BLIND CUTTING MACHINE

(75) Inventors: Michael Kollman, Madison, WI (US); Adam Ward, Madison, WI (US)

(73) Assignee: Lumino, Inc., Madison, WI (US)

( * ) Notice: Subject to any disclaimer, the term of this patent is extended or adjusted under 35 U.S.C. 154(b) by 1667 days.

(21) Appl. No.: 11/035,604

(22) Filed: Jan. 14, 2005

(65) Prior Publication Data

US 2006/0156882 A1 Jul. 20, 2006

(51) Int. Cl.
*B26D 7/06* (2006.01)
*B26D 7/00* (2006.01)

(52) U.S. Cl.
USPC .......... 83/167; 83/100; 83/76.9; 83/452; 83/256

(58) Field of Classification Search
USPC .......... 83/76.9, 167, 100, 452, 256, 199, 83/622, 694, 513, 519, 621, 604, 197, 659, 83/200, 196; 29/24.5
See application file for complete search history.

(56) References Cited

U.S. PATENT DOCUMENTS

| | | | |
|---|---|---|---|
| 5,006,699 A * | 4/1991 | Felkner et al. | 235/462.49 |
| 5,799,557 A | 9/1998 | Wang | |
| 5,806,394 A | 9/1998 | Marocco | |
| 6,196,099 B1 | 3/2001 | Marocco | |
| 6,240,824 B1 * | 6/2001 | Hsu | 83/622 |
| 6,249,710 B1 * | 6/2001 | Drucker et al. | 700/15 |
| 6,412,381 B1 | 7/2002 | Wang et al. | |
| 6,427,571 B1 | 8/2002 | Hsu | |
| 6,484,939 B1 * | 11/2002 | Blaeuer | 235/383 |
| 6,615,698 B2 | 9/2003 | Chuang et al. | |
| 6,945,152 B2 * | 9/2005 | Jabbari et al. | 83/468.7 |
| 7,255,031 B2 * | 8/2007 | Nien et al. | 83/465 |
| 2002/0145038 A1 * | 10/2002 | O'Hagan et al. | 235/383 |
| 2004/0103767 A1 * | 6/2004 | Lin et al. | 83/13 |
| 2004/0149104 A1 * | 8/2004 | Jabbari et al. | 83/454 |
| 2005/0115375 A1 * | 6/2005 | Dick et al. | 83/358 |

* cited by examiner

*Primary Examiner* — Ghassem Alie
(74) *Attorney, Agent, or Firm* — Buchanan Ingersoll & Rooney PC

(57) ABSTRACT

An improved blind cutting machine has a work surface on which a blind to be cut is placed and at least one end stop against which an end of the blind to be cut rests prior to being cut by a cutting mechanism. An actuator is connected to the end stop. The actuator moves the end stop relative to the work surface and the cutting mechanism in response to signals from a controller. An operator enters information about the blind to be cut and the dimensions of an opening over which the blind to be cut is to be mounted into the controller. The controller then calculates the location where the end stop should be so that a sufficient amount of material can be trimmed from an end of the blind to be cut to enable the blind to fit the opening. Then the controller sends a signal to the actuator that causes the actuator to move the end stop to that location. In alternative embodiments the end stop is fixed and the actuator moves the cutting mechanism or a work surface on which the blind to be cut has been placed.

15 Claims, 5 Drawing Sheets

BLIND CUTTING MACHINE

FIELD OF INVENTION

The invention relates to a machine that is used to trim stock sizes of venetian type blinds to fit an opening whose dimensions are provided by a customer.

BACKGROUND OF THE INVENTION

Many home centers and other retailers of window covering products purchase venetian blinds in stock sizes from a blind manufacturer and display those blinds in retail store locations. These retailers have machines, called cut-down machines, which a salesperson or technician can use to trim a stock blind to fit a window, door or other opening having dimensions smaller than the dimensions of a stock blind. Typically, the customer provides these dimensions. For example, a customer may tell a salesperson that the dimensions of the window to be covered by the blind are 34 inches wide and 48 inches tall. The stock blind closest to those dimensions is 36 inches wide and 48 inches in length. Consequently, it will be necessary to cut two inches from the width of the stock blind to create a blind that will fit the customer's window. Because the customer usually wants each of the two ladders in a venetian blind of this size to be the same distance from the edge of the blind nearest the ladder, the retailer will cut away an equal amount of material from each edge of the blind rather than cut all the material from one edge of the blind. In the example, one inch would be cut from each edge of the blind. If the blind is too long for the opening, extra slats or other window covering material can be removed from the bottom of the blind. A cut-down machine is not used for this purpose.

There are several types of blind trimming machines known in the art. One type of machine, disclosed in U.S. Pat. No. 6,615,698 to Chuang et al., has a pair of trimming units, which are adapted from conventional power miter saws. The blind to be cut down is placed upon a work surface so that each side of the blind is fitted through a trimming unit similar to a miter box. An adjustable end stop is provided near each trimming unit to enable the blind to be positioned in the trimming unit so that the correct amount of material is trimmed from the blind. The end stops are manually moved by the operator using a rule or scale provided near the end stop. Consequently, an operator of the machine must calculate the amount of material to be removed from each side or end of a stock blind and then manually position each end stop so that the correct amount of material is cut away.

Another type of blind cutting machine has a cutting mechanism that can cut only one end of a blind. In this type of machine the operator uses the same cutting mechanism to cut one end or side of the blind then repositions the blind and cuts the opposite end of the blind. Most of these machines have a set of cutting dies that act as the cutting mechanism. These machines also have a manually adjustable end stop, which is used to position blind relative to the cutting mechanism so that the proper amount of material is cut away from the blind. The operator of these machines must calculate the amount of material to be trimmed from each side or end of the blind and then use a ruler or scale to position the stop so that the correct amount of material is removed. Examples of this type of machine can be found in U.S. Pat. No. 5,799,557 to Wang and U.S. Pat. Nos. 5,806,394 and 6,196,099 to Marocco.

One major manufacturer provides a mathematical wheel to dial in the width measurements and type of mount. After the variables have been entered the wheel will tell the sales associate the distance at which to set the end stop. Another blind manufacturer provides a modified tape measure on the machine. A piece of plastic is attached to the middle of each blind. That plastic piece is used to align the middle of the blind with a tape measure on the cutting surface.

Whenever an operator must make calculations and set end stops the possibility for errors exists. But, a more significant shortcoming of the blind trimming machines having manually adjustable stops is the time that an operator spends in positioning the end stop. It may take as much as 5 to 10 minutes for a sales associate to complete the entire cutting process. Consequently, there is a need for a blind trimming machine that automatically calculates the amount of material that should be trimmed from a blind and then automatically positions the end stops so that the correct amount of material is cut away.

SUMMARY OF THE INVENTION

We provide a blind cutting machine of the type having a work surface on which a blind to be cut is placed and at least one end stop against which an end of the blind to be cut rests prior to being cut by a cutting mechanism. The cutting mechanism may be a saw, or set of cutting dies or blades and can be a power tool or manually operated. We provide an actuator attached to the end stop for moving the end stop relative to the work surface. A controller is connected to the actuator and has a memory containing a program. When an operator enters information about the blind to be cut and the dimensions of an opening over which the blind to be cut is to be mounted the controller sends a signal to the actuator which causes the actuator to position the end stop at a location where a correct amount of material can be trimmed from an end of the blind to be cut to enable the blind to fit the opening.

In an alternative embodiment the end stop is fixed and the cutting mechanism is movable.

In yet another embodiment, the blind is attached to a movable carrier that is automatically moved into position relative to a fixed cutting mechanism. The carrier typically will have a fixed end stop or other reference for positioning a blind in the carrier.

We prefer to provide two keypads on the controller. One keypad is used to enter the customer's measurements. The second keypad is used to enter the measurements of the blind to be trimmed. A separate display is preferably provided adjacent each keypad. One may also provide a bar code reader that can be used to enter information from the box or label on the blind to be trimmed.

We also prefer to provide buttons on the controller that enable the user to select the type of mount and the type of window covering being trimmed.

Other objects and advantages of the present invention will become apparent from a description of certain present preferred embodiments thereof shown in the drawings.

DESCRIPTION OF THE PREFERRED EMBODIMENTS

Figure 1:
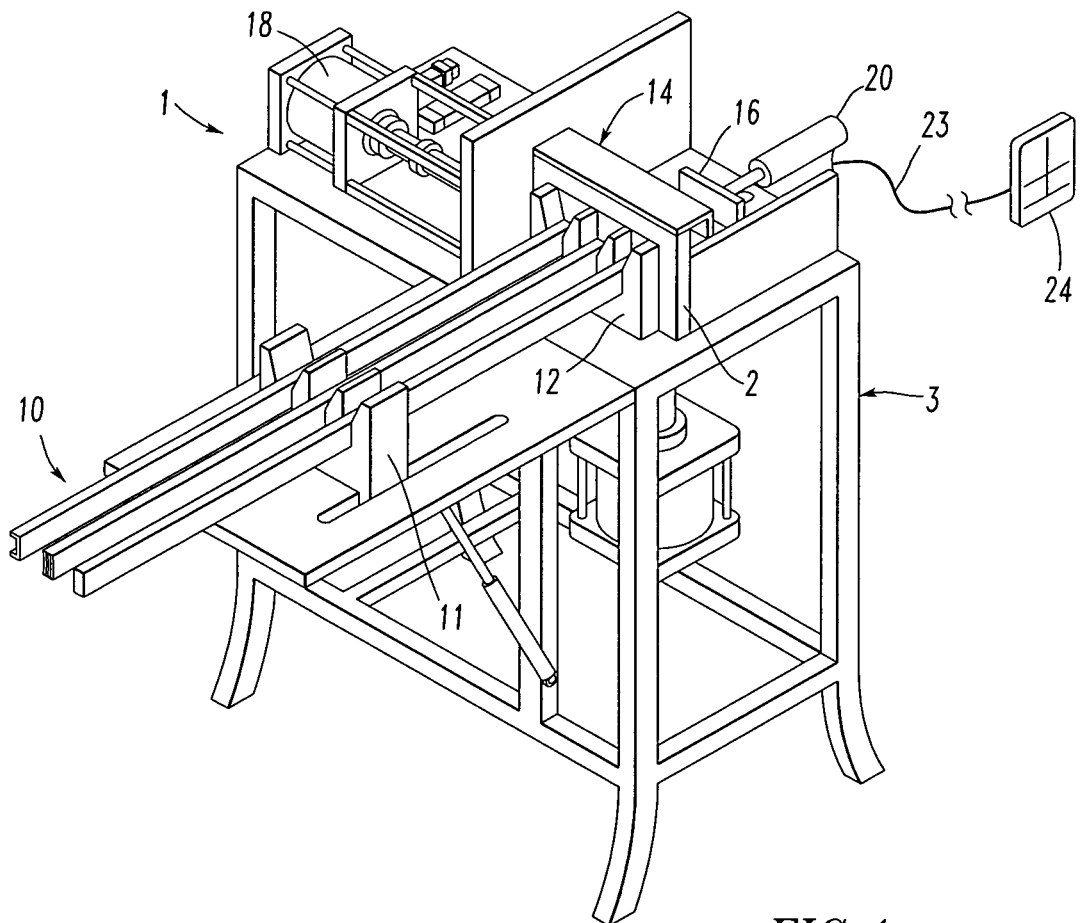
FIG. 1 is a perspective view of a first present preferred embodiment of our blind cutting machine.
Figure 2:
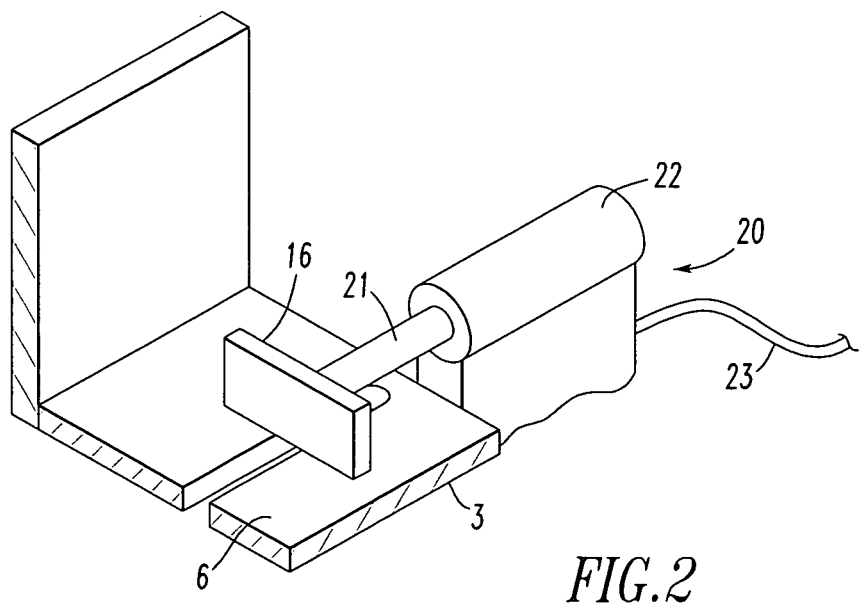
FIG. 2 is a perspective view of the portion of the cutting machine shown in FIG. 1 where the end stop is located.
Figure 3:
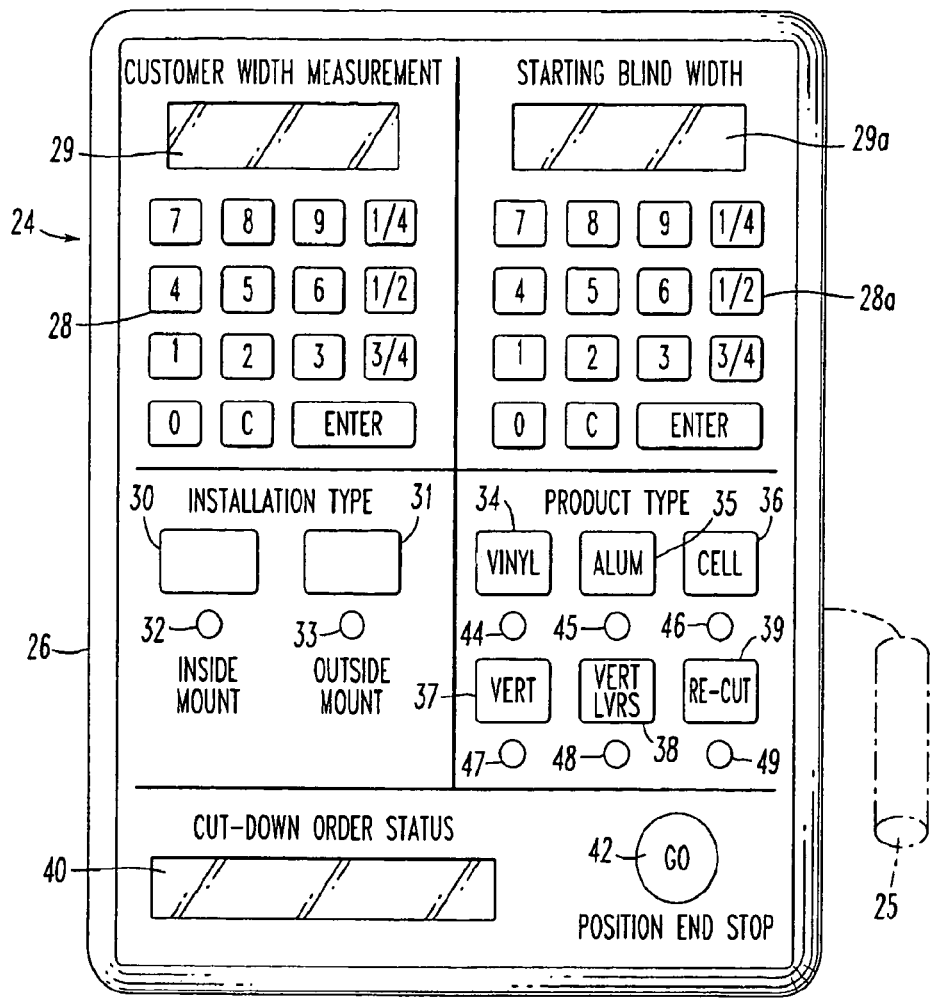
FIG. 3 is a top plan view of a present preferred controller used in the embodiment of FIGS. 1 and 2.
Figure 4:
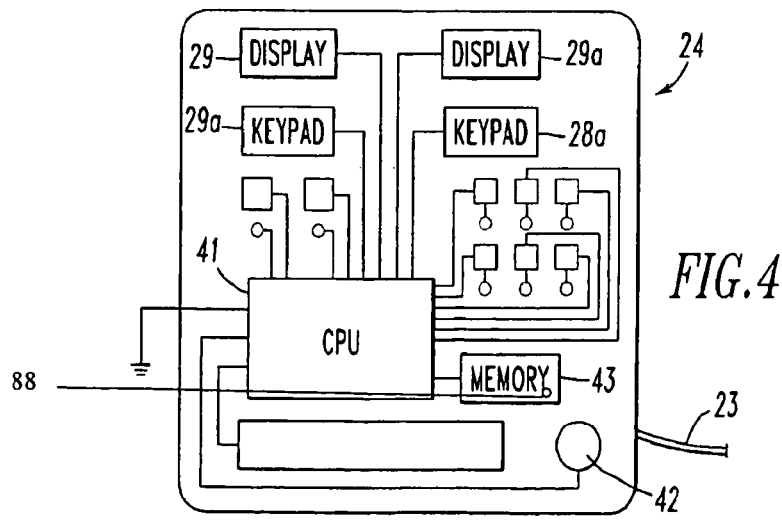
FIG. 4 is a diagram of the basic components of the controller.

A first present preferred embodiment of our cutting machine 1 shown in FIG. 1 has a stand 3 that holds the cutting mechanism 2, which trims the end of the blind. A work surface 6 extends from the stand and is used to hold a venetian blind 10 to be trimmed. A first blind holder 11 is placed adjacent the cutting mechanism and a second blind holder 12 is on the work surface 6. The blind is positioned to extend through the cutting dies 14 and abut an end stop 16. So that the end stop 16 can be seen in FIG. 1, the blind is not shown as abutting the end stop. When the blind is properly positioned an electric actuator 18 is activated to move the cutting dies to trim the blind. A preferred construction of the cutting dies and detailed discussion of the operation of the cutting mechanism illustrated in FIG. 1 can be found in U.S. Pat. No. 5,699,557, the content of which is incorporated herein by reference. An actuator 20 is attached to the stand 3 and has a plunger 21 that is attached to end stop 16. The actuator moves the end stop relative to the work surface 6 and cutting mechanism 2. The actuator could be a servomotor, a pneumatic cylinder or hydraulic cylinder. In the embodiment shown in FIGS. 1 and 2, the actuator is a hydraulic cylinder having a plunger 21 that moves out of and into the cylinder 22. The distal end of the plunger 21 is attached to the end stop. The hydraulic cylinder is connected to a controller 24 by cable 23. The controller may be mounted on the stand 3, but preferably is removable from the stand. If desired a transmitter/receiver (not shown) could be used in place of the cable 23. The controller, shown in detail in FIGS. 3 and 4, has a housing 26 that contains a processing unit 41 and memory 43. Two keypads 28, 28a are provided on the top of the housing. The keypads are used to enter information or data relating to the stock blind to be trimmed and the dimensions of the window, door or other opening to be covered by the blind to be trimmed. If desired a bar code reader 25 (shown in dotted line in FIG. 3) may be provided to read information from the container of the stock blind or a label on the stock blind to be trimmed. Although a single keypad could be used to enter all necessary information, we prefer to provide two keypads. One keypad 28 is used to enter customer width measurements and the second keypad 28a is used to enter information about the stock blind. As the data is entered, each number appears on the liquid crystal display 29 or 29a above the keypad on which the data was entered. Window blinds may be sized to fit within the perimeter of the window frame or to extend beyond the perimeter of the window frame. When a blind is mounted to fit within the perimeter of the window frame, the industry calls the attachment an inside mount. A blind that extends beyond the perimeter of the window frame and is attached to or adjacent the window frame is called an outside mount. As can be seen in FIG. 3 we prefer to provide buttons 30, 31 which allow the operator to select an inside mount or an outside mount. When button 30 is pressed an LED 32 adjacent the button illuminates. When button 31 is pressed, LED 33 adjacent button 32 illuminates. We also prefer to provide buttons 34 through 39 and adjacent LED's 44 through 49 to enable the operator to select the type of window covering product to be trimmed. The choices are a vinyl venetian blind indicated by the word VINYL on button 34, an aluminum venetian blind, indicated by the letters ALUM on button 35, a cellular shade indicated by CELL on button 36, a vertical blind indicated by VERT on button 37, and one or more louvers from a vertical blind, indicated by VERT LVRS on button 38. These buttons are required because the blind width measurement listed on the box will be one half inch greater than the actual width of an aluminum blind or cellular shade, but the same as the actual width of a vinyl blind, and the same as the actual length of a vertical blind or vertical louvers. A re-cut of a window covering is indicated by RE-CUT on button 39. A re-cut occurs when at least one end of the blind has been mis-cut and must be trimmed again. Typically, the end stop would be positioned in the same location relative to the cutting mechanism for a re-cut. Whenever one of buttons 34 through 39 is pressed the LED adjacent that button 44, 45, 46, 47, 48 or 49 is illuminated. If desired a dial or selector switches could be used to enter the data that identifies the installation type and product type.

After the operator has entered the customer width measurement and the stock blind or starting blind width, selected an inside mount or an outside mount and selected the product type, the operator presses the GO button 42. The processor 41 then computes the amount of material that must be removed from each end or side of the blind and activates the actuator 20 to position the end stop so that the correct amount of material is cut away. The programs 88 for making the calculations and prompting the actuator are in a memory 43 inside the controller. The memory may also contain a look-up table containing product identifiers and a blind width associated with each product identifier for certain stock blinds. Then the operator need only enter the product identifier, such as a bar code, for the starting blind.

We prefer to provide a message display 40 on the top of the controller. The message display may contain instructions to guide the operator through the data entry process.

Figure 7:
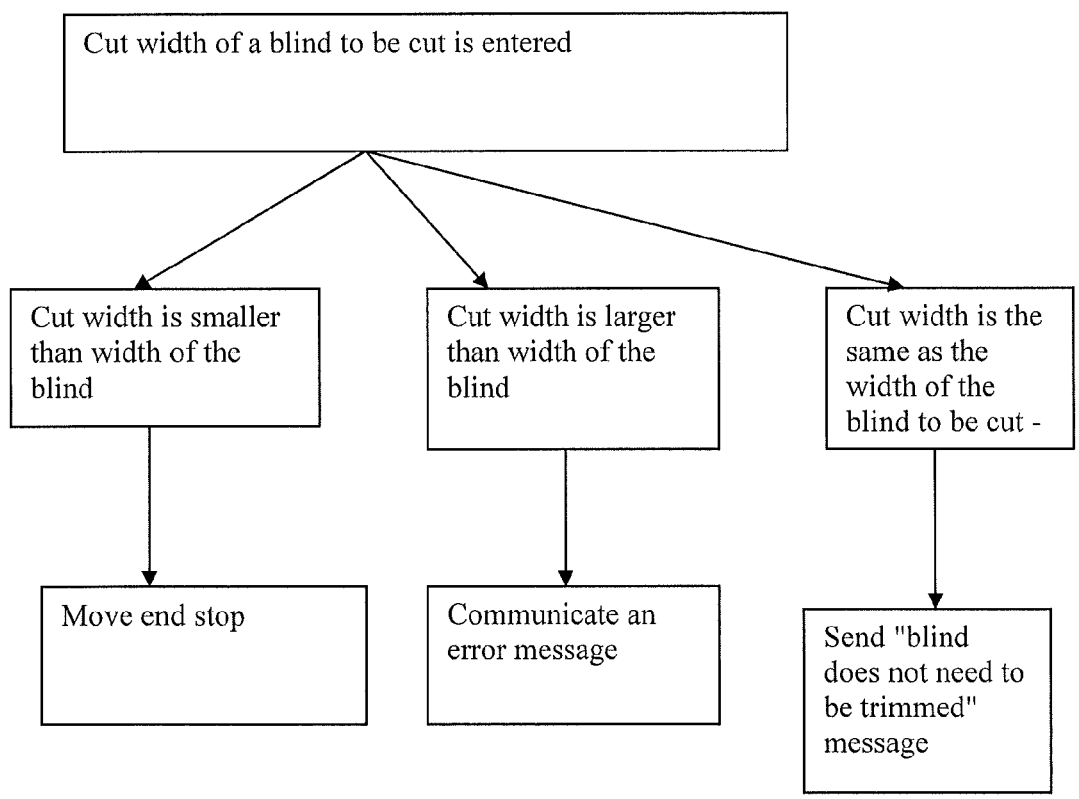
FIG. 7 is a flow chart illustrating a present preferred configuration for a controller.

As may be appreciated from FIG. 7, the controller may be configured so that in the event that the operator enters a starting blind width, which is the same as the customer width measurement, a message will appear on display 40 telling the operator that the blind does not need to be trimmed. Should the operator enter a starting blind width that is less than the customer width measurement an error message will appear in message display 40. After the operator enters a starting blind width greater than the customer width measurement and selects a product type and inside mount or outside mount the display 40 will notify the operator when the end stop is in position to make the cut. If desired, another light emitting diode (not shown) could be provided on the controller housing that illuminates when the end stop is in position to make the cut. The controller 24 may also contain a bell, tone generator, buzzer or other device that produces an audible sound when a data entry error has occurred or when the end stop is in position for a cut to be made. The controller is connected to a power source. If the cutting mechanism utilizes electrical power the same power source could be used for the controller, actuator and cutting mechanism. If the cutting mechanism is manually operated, one or more batteries may provide power for the controller and actuator.

After the end stop is in position the operator places one end of the blind against the end stop and operates the cutting mechanism. Then he or she removes the excess material from the machine and places the opposite end against the end stop. Now the opposite end of the blind can be trimmed to complete the process.

Figure 5:
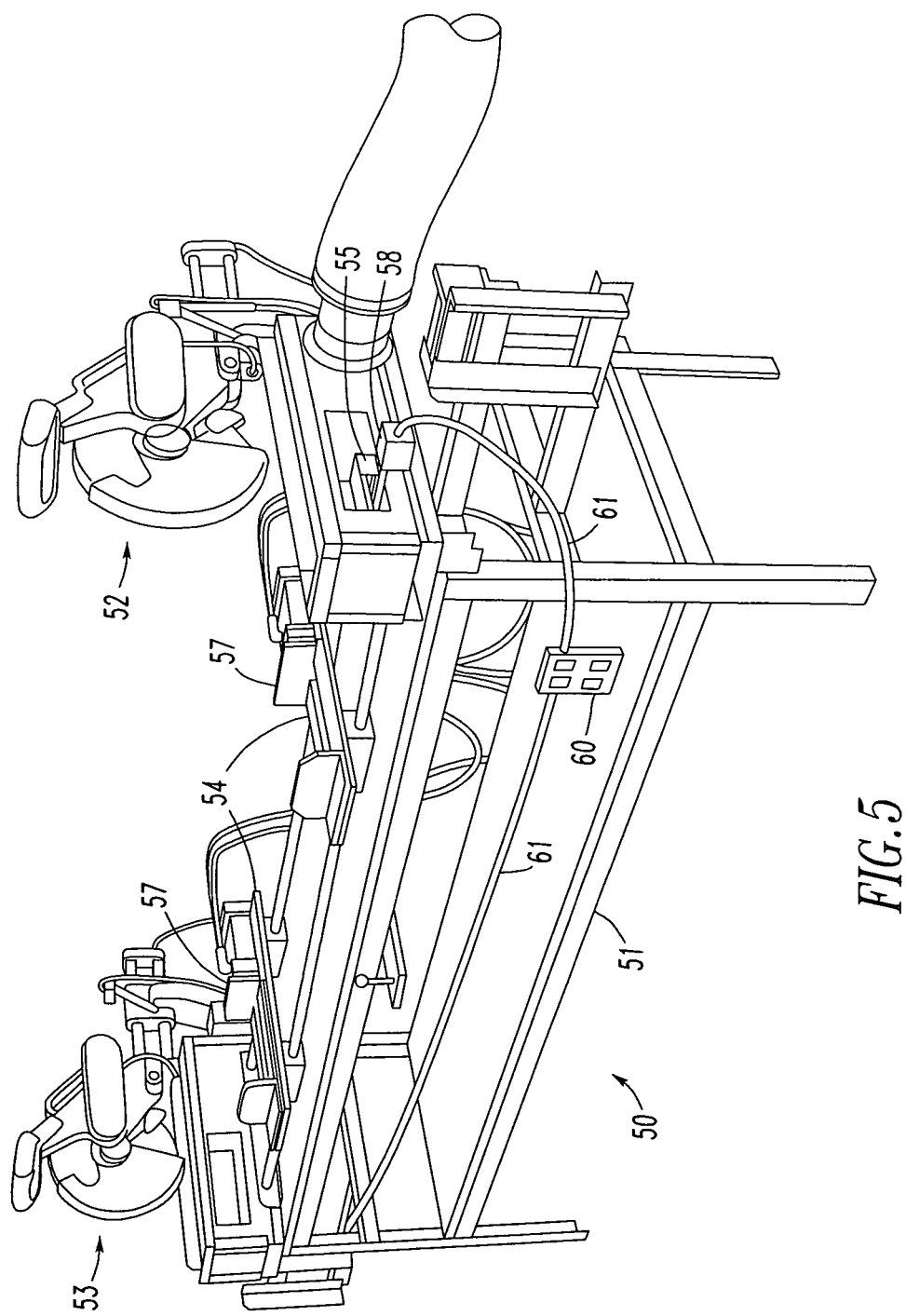
FIG. 5 is a perspective view of a second present preferred embodiment of our cutting machine.

A second present preferred cutting machine 50 shown in FIG. 5 has a stand 51 and two cutting mechanisms 52 and 53, each of which cuts only one end or side of the blind 10 to be trimmed. This cutting machine is similar to the dual-end blind trimming machine disclosed in U.S. Pat. No. 6,615,698, the content of which is incorporated herein by reference. The blind is placed on work surfaces 54 between end stops 55 and guide 57. An actuator 58 is attached to each end stop 55 and each actuator is connected to the controller 60 by a cable 61. The end stops are movable relative to the work surface and the cutting mechanisms. Only one actuator and end stop can be seen in FIG. 5. The second end stop and actuator are behind the second cutting mechanism 53 and are identical to those that can be seen in the drawing. After the customer width measurement, starting blind width, installation type and product type are entered, the controller sends a signal to each actuator which causes each actuator to move the associated end stop to a position where the cutting mechanisms will remove the proper amount of material from each end or side of the blind. The controller in this embodiment is similar to the controller of the embodiment of FIGS. 1 through 4, but operates two actuators and associated end stops rather than a single actuator and associated end stop.

A third present preferred embodiment can easily be understood with reference to FIG. 5. In this embodiment the end stops 55 and surfaces 54 do not move. Instead, the actuators 58 move the cutting mechanisms relative to the end stops and work surfaces. To operate this embodiment the blind is positioned to abut one of the end stops. Then the measurements are entered into the controller and the actuators position the cutting mechanism or cutting mechanisms so that the correct amount of material is trimmed from the blind.

Figure 6:
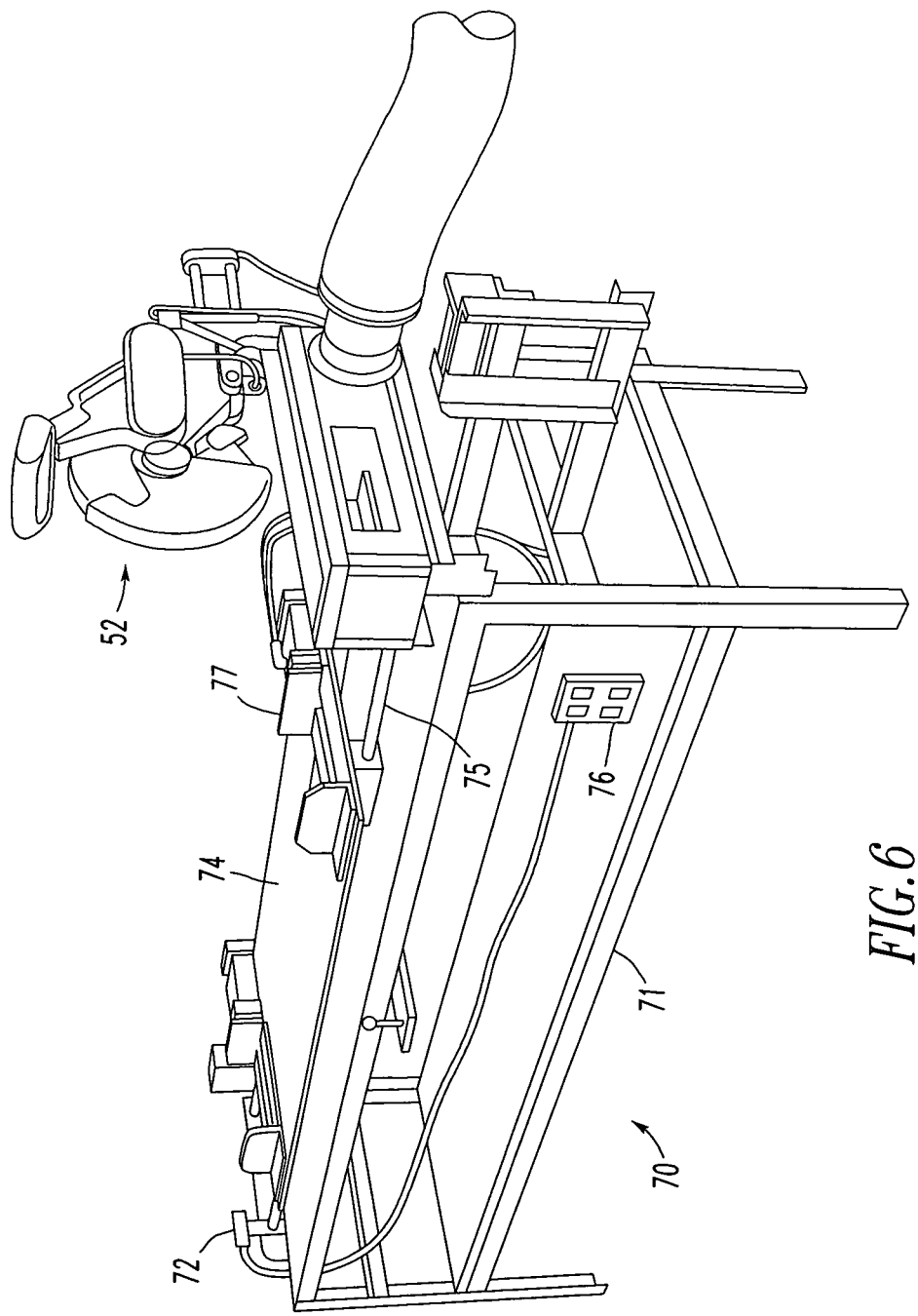
FIG. 6 is a perspective view of another present preferred embodiment of our cutting machine.

A fourth present preferred embodiment is shown in FIG. 6. In this cutting machine 70 a stand 71 has a cutting mechanism attached to one end. A moveable work surface 77 rides on rods 75. An actuator 72 is provided at the opposite end of stand 71 and is connected to work surface 74. The actuator is connected to the controller. A user places a blind to be trimmed on the movable work surface 77 aligning the end of he blind with an edge of the work surface 77 or a stop or other alignment structure or marking (not shown) on the work surface 77. Then the user enters the information into the controller 76. The controller prompts the actuator to move the moveable work surface 77 and blind on that surface relative to the cutting mechanism 52 so that the correct amount of material can be trimmed from the blind. If desired the activator may be under the work surface 74.

The embodiments here disclosed automatically calculate the amount to be trimmed and then position the end stop or end stops relative to the cutting mechanism so that the proper amount of material is cut away. As a result the trimming process will be faster and less prone to error than the trimming processes followed with the blind cutting machines of the prior art.

Although the cutting mechanisms in the preferred embodiments are motorized this is not required. For example, one could substitute the manual cutting mechanism disclosed in U.S. Pat. No. 5,333,365 to Marocco et al. for the cutting mechanism in the embodiments of FIGS. 1 through 5.

Although we have described and illustrated certain present preferred embodiments of our blind trimming machine and methods of trimming blinds, the invention is not limited thereto and may be variously embodied within the scope of the following claims.

We claim:

1. An improved blind cutting machine of the type having a work surface on which a blind is to be cut is placed, an end stop against which an end of the blind to be cut rests prior to being cut and a cutting mechanism which cuts the blind to be cut, the improvement comprising:

an actuator attached to the end stop for moving the end stop relative to the work surface; and
a controller connected to the actuator, the controller having:
a housing,
a data entry device attached to the housing,
a display attached to the housing,
a memory, and
a processor;
the memory containing a program such that when an operator enters information that comprises a product type and at least one product identifier which is not merely a dimension of the product and with which at least one dimension of the blind to be cut is associated and the dimensions of an opening over which the blind to be cut is to be mounted the controller sends a signal to the actuator which causes the actuator to position the end stop at a location where a correct amount of material can be trimmed from an end of the blind to be cut to enable the blind to fit the opening.

2. The improved blind cutting machine of claim 1 wherein the dimensions of the opening over which the blind to be cut is to be mounted is comprised of dimensions of a window or door and whether the blind will have an inside mount or an outside mount.

3. The improved blind cutting machine of claim 1 wherein the data entry device is comprised of at least one of a keypad and a bar code reader.

4. The improved blind cutting machine of claim 1 also comprising at least one display on the controller.

5. The improved blind cutting machine of claim 4 wherein the display is a liquid crystal display.

6. The improved blind cutting machine of claim 1 wherein the blind cutting machine has a second end stop and a second cutting mechanism and further comprising a second actuator connected to the second end stop and to the controller.

7. The improved blind cutting machine of claim 1 wherein the memory contains a look-up table containing product identifiers and a blind width associated with each product identifier.

8. The improved blind cutting machine of claim 1 wherein the actuator is comprised of a hydraulic cylinder or a servomotor.

9. The improved blind cutting machine of claim 1 wherein the controller comprises at least one data entry device which enables a user to enter at least one of product type and installation type.

10. The improved blind of claim 9 wherein the data entry device is comprised of at least one button.

11. The improved blind cutting machine of claim 1 wherein the at least one product identifier is obtained from at least one bar code.

12. The improved blind cutting machine of claim 1 wherein the product type is at least one of venetian blinds, vinyl venetian blinds, aluminum venetian blinds, vertical louvers, and cellular shades.

13. The improved blind cutting machine of claim 1 wherein the memory contains a program that will cause an error message to be communicated to a user whenever:

i.) an operator enters a width of a blind to be cut and a width provided by the customer, and
ii.) the width of a blind to be cut is not greater than the width provided by the customer.

14. An improved blind cutting machine of the type having a work surface on which a blind is to be cut is placed, an end stop against which an end of the blind to be cut rests prior to being cut and a cutting mechanism which cuts the blind to be cut, the improvement comprising:

an actuator attached to the end stop for moving the end stop relative to the work surface; and a controller connected to the actuator, the controller having:
a housing,
a data entry device attached to the housing,
a display attached to the housing,
a memory, and
a processor;

the controller configured such that when an operator enters information about the blind to be cut and the dimensions of an opening over which the blind to be cut is to be mounted the controller sends a signal to the actuator which causes the actuator to position the end stop at a location where a correct amount of material can be trimmed from an end of the blind to be cut to enable the blind to fit the opening; and wherein the controller is configured such that the controller will cause an error message to appear in the display whenever:

i.) an operator enters a width of a blind to be cut and a width provided by the customer, and ii.) the width of a blind to be cut is not greater than the width provided by the customer.

15. The improved blind cutting machine of claim 14 wherein the error message is comprised of at least one audible sound.

* * * * *